US007539620B2

(12) United States Patent
Winterton et al.

(10) Patent No.: US 7,539,620 B2
(45) Date of Patent: May 26, 2009

(54) SYSTEM AND METHOD FOR FACILITATING TRANSACTIONS AMONG CONSUMERS AND PROVIDERS OF TRAVEL SERVICES

(75) Inventors: Andrew Winterton, Berkshire (GB); Meera Iyer, Houston, TX (US)

(73) Assignee: American Express Travel Related Services Company, Inc., New York, NY (US)

( * ) Notice: Subject to any disclaimer, the term of this patent is extended or adjusted under 35 U.S.C. 154(b) by 1168 days.

(21) Appl. No.: 10/611,037

(22) Filed: Jun. 30, 2003

(65) Prior Publication Data

US 2004/0059610 A1    Mar. 25, 2004

Related U.S. Application Data

(63) Continuation-in-part of application No. 10/217,666, filed on Aug. 12, 2002, and a continuation-in-part of application No. 10/188,768, filed on Jul. 2, 2002.

(60) Provisional application No. 60/428,443, filed on Nov. 22, 2002, provisional application No. 60/428,062, filed on Nov. 21, 2002.

(51) Int. Cl.
*G06Q 99/00* (2006.01)
(52) U.S. Cl. ........................................................ 705/1
(58) Field of Classification Search ........................ 705/1
See application file for complete search history.

(56) References Cited

U.S. PATENT DOCUMENTS 4,359,631 A    11/1982    Lockwood et al.
4,449,186 A    5/1984    Kelly et al.
4,490,810 A    12/1984    Hon (Continued)

FOREIGN PATENT DOCUMENTS

EP    0762306    3/1997

(Continued)

OTHER PUBLICATIONS

Shepherd, David, SLAM Model of Domestic Airline Passenger Fairs and the Contract Air Service Program, Air Force Institute of Technology, Sep. 1986.

(Continued)

*Primary Examiner*—Jonathan Ouellette
(74) *Attorney, Agent, or Firm*—Snell & Wilmer L.L.P.

(57) ABSTRACT

A system for facilitating transactions among consumers and providers of travel-related services includes a technology provider and a host in communication with an agent and a provider of travel-related services. The technology provider is configured for operating independently from any provider of travel-related services. The host is configured for receiving a request from the agent, retrieving one or more displays from the technology provider, presenting the displays to the agent, and facilitating a transaction among the consumer and the provider of travel-related services. A display comprises an information content such as available inventory from a predefined carrier within a predefined time period. The display may be configured for excluding content, for example, in accordance with a predefined editing criteria. The format may be configured for presenting information in accordance with one or more predefined ranking criteria, which may be a discriminatory criteria, such as an identity of a carrier.

18 Claims, 3 Drawing Sheets

U.S. PATENT DOCUMENTS

| | | |
|---|---|---|
| 4,818,854 A | 4/1989 | Davies et al. |
| 4,845,625 A | 7/1989 | Stannard |
| 4,862,357 A | 8/1989 | Ahlstrom et al. |
| 4,922,439 A | 5/1990 | Greenblatt |
| 4,965,763 A | 10/1990 | Zamora |
| 5,021,953 A | 6/1991 | Webber et al. |
| 5,056,019 A | 10/1991 | Schultz et al. |
| 5,155,678 A | 10/1992 | Fukumoto et al. |
| 5,191,523 A | 3/1993 | Whitesage |
| 5,235,509 A | 8/1993 | Mueller et al. |
| 5,235,680 A | 8/1993 | Bijnagte |
| 5,237,499 A | 8/1993 | Garback |
| 5,239,480 A | 8/1993 | Huegel |
| 5,241,671 A | 8/1993 | Reed et al. |
| 5,253,165 A | 10/1993 | Leiseca et al. |
| 5,253,166 A | 10/1993 | Dettelbach et al. |
| 5,255,184 A | 10/1993 | Hornick et al. |
| 5,270,921 A | 12/1993 | Hornick |
| 5,274,758 A | 12/1993 | Beitel et al. |
| 5,287,278 A | 2/1994 | Rau |
| 5,289,371 A | 2/1994 | Abel et al. |
| 5,331,546 A | 7/1994 | Webber et al. |
| 5,393,964 A | 2/1995 | Hamilton et al. |
| 5,408,417 A | 4/1995 | Wilder |
| 5,422,809 A | 6/1995 | Griffin et al. |
| 5,459,306 A | 10/1995 | Stein et al. |
| 5,483,444 A | 1/1996 | Heintzeman et al. |
| 5,526,443 A | 6/1996 | Nakayama |
| 5,570,283 A | 10/1996 | Shoolery et al. |
| 5,581,461 A | 12/1996 | Coll et al. |
| 5,598,557 A | 1/1997 | Doner et al. |
| 5,644,721 A | 7/1997 | Chung et al. |
| 5,648,900 A | 7/1997 | Bowen et al. |
| 5,652,842 A | 7/1997 | Siegrist, Jr. et al. |
| 5,687,322 A | 11/1997 | Deaton et al. |
| 5,761,442 A | 6/1998 | Barr et al. |
| 5,764,981 A | 6/1998 | Brice et al. |
| 5,781,892 A | 7/1998 | Hunt et al. |
| 5,809,478 A | 9/1998 | Grfeco et al. |
| 5,812,134 A | 9/1998 | Pooser et al. |
| 5,832,451 A | 11/1998 | Flake et al. |
| 5,832,453 A | 11/1998 | O'Brien |
| 5,832,454 A | 11/1998 | Jafri et al. |
| 5,839,114 A | 11/1998 | Lynch et al. |
| 5,842,176 A | 11/1998 | Hunt et al. |
| 5,857,175 A | 1/1999 | Day et al. |
| 5,884,272 A | 3/1999 | Walker et al. |
| 5,894,311 A | 4/1999 | Jackson |
| 5,894,475 A | 4/1999 | Bruno et al. |
| 5,897,620 A | 4/1999 | Walker et al. |
| 5,909,510 A | 6/1999 | Nakayama |
| 5,918,022 A | 6/1999 | Batz et al. |
| 5,926,798 A | 7/1999 | Carter |
| 5,940,803 A | 8/1999 | Kanemitsu |
| 5,948,040 A * | 9/1999 | DeLorme et al. ............ 701/201 |
| 5,953,706 A | 9/1999 | Patel |
| 5,960,383 A | 9/1999 | Fleischer |
| 5,968,125 A | 10/1999 | Garrick et al. |
| 5,974,396 A | 10/1999 | Anderson et al. |
| 5,983,246 A | 11/1999 | Takano |
| 5,987,252 A | 11/1999 | Leino et al. |
| 5,995,939 A | 11/1999 | Berman et al. |
| 5,999,728 A | 12/1999 | Cable |
| 6,009,403 A | 12/1999 | Sato |
| 6,009,408 A | 12/1999 | Buchanan |
| 6,012,069 A | 1/2000 | Shibazaki |
| 6,018,715 A | 1/2000 | Lynch et al. |
| 6,018,718 A | 1/2000 | Walker et al. |
| 6,023,679 A | 2/2000 | Acebo et al. |
| 6,024,288 A | 2/2000 | Gottlich et al. |
| 6,028,601 A | 2/2000 | Machiraju et al. |
| 6,029,144 A | 2/2000 | Barrett et al. |
| 6,067,532 A | 5/2000 | Gebb |
| 6,070,147 A | 5/2000 | Harms et al. |
| 6,085,164 A | 7/2000 | Smith et al. |
| 6,085,169 A | 7/2000 | Walker et al. |
| 6,085,976 A | 7/2000 | Sehr |
| 6,101,477 A | 8/2000 | Hohle et al. |
| 6,112,185 A | 8/2000 | Walker et al. |
| 6,118,989 A | 9/2000 | Abe et al. |
| 6,119,094 A | 9/2000 | Lynch et al. |
| 6,119,095 A | 9/2000 | Morita |
| 6,119,096 A | 9/2000 | Mann et al. |
| 6,119,229 A | 9/2000 | Martinez et al. |
| 6,121,969 A | 9/2000 | Jain et al. |
| 6,122,642 A | 9/2000 | Mehovic |
| 6,134,534 A | 10/2000 | Walker et al. |
| 6,148,290 A | 11/2000 | Dan et al. |
| 6,151,582 A | 11/2000 | Huang et al. |
| 6,157,915 A | 12/2000 | Bhaskaran et al. |
| 6,157,918 A | 12/2000 | Shepherd |
| 6,163,771 A | 12/2000 | Walker et al. |
| 6,167,368 A | 12/2000 | Wacholder |
| 6,185,524 B1 | 2/2001 | Carus et al. |
| 6,185,558 B1 | 2/2001 | Bowman et al. |
| 6,185,592 B1 | 2/2001 | Boguraev et al. |
| 6,188,989 B1 | 2/2001 | Kennedy |
| 6,195,644 B1 | 2/2001 | Bowie |
| 6,199,147 B1 | 3/2001 | Smith et al. |
| 6,223,163 B1 | 4/2001 | Van Luchene |
| 6,229,534 B1 | 5/2001 | Gerra et al. |
| 6,263,315 B1 | 7/2001 | Talluri |
| 6,292,790 B1 | 9/2001 | Krahn et al. |
| 6,304,850 B1 | 10/2001 | Keller et al. |
| 6,324,517 B1 | 11/2001 | Bingham et al. |
| 6,336,097 B1 | 1/2002 | Scipioni |
| 6,442,526 B1 | 8/2002 | Vance et al. |
| 6,477,520 B1 | 11/2002 | Malaviya et al. |
| 6,754,634 B1 | 6/2004 | Ho |
| 6,804,658 B2 | 10/2004 | Lim et al. |
| 6,839,679 B1 | 1/2005 | Lynch et al. |
| 6,944,133 B2 | 9/2005 | Wisner et al. |
| 6,963,854 B1 | 11/2005 | Boyd et al. |
| 7,016,859 B2 | 3/2006 | Whitesage |
| 7,050,986 B1 | 5/2006 | Vance et al. |
| 7,165,036 B2 | 1/2007 | Kruk et al. |
| 7,302,399 B1 | 11/2007 | Donovan et al. |
| 2001/0005831 A1 | 6/2001 | Lewin et al. |
| 2001/0034626 A1 | 10/2001 | Gillespie |
| 2001/0047289 A1 | 11/2001 | McKee et al. |
| 2001/0049693 A1 | 12/2001 | Pratt |
| 2001/0051885 A1 | 12/2001 | Nardulli et al. |
| 2001/0054105 A1 | 12/2001 | Furusawa et al. |
| 2002/0010604 A1 | 1/2002 | Block |
| 2002/0013774 A1 | 1/2002 | Morimoto |
| 2002/0077871 A1 | 6/2002 | Udelhoven et al. |
| 2002/0143587 A1 | 10/2002 | Champernowne |
| 2002/0152100 A1 | 10/2002 | Chen et al. |
| 2002/0152101 A1 | 10/2002 | Lawson et al. |
| 2002/0178034 A1 | 11/2002 | Garner et al. |
| 2003/0040946 A1 | 2/2003 | Sprenger et al. |
| 2003/0055690 A1 | 3/2003 | Garback |
| 2003/0110063 A1 | 6/2003 | Among et al. |
| 2003/0115159 A1 | 6/2003 | Gillespie |
| 2003/0120526 A1 | 6/2003 | Altman et al. |
| 2003/0140007 A1 | 7/2003 | Kramer et al. |
| 2003/0144867 A1 | 7/2003 | Campbell et al. |
| 2004/0260581 A1 | 12/2004 | Baranowski et al. |
| 2004/0267623 A1 | 12/2004 | Vivadelli et al. |
| 2005/0015295 A1 | 1/2005 | McCulloch |
| 2006/0111956 A1 | 5/2006 | Whitesage |
| 2006/0146806 A1 | 7/2006 | Khuc et al. |
| 2006/0212321 A1 | 9/2006 | Vance et al. |

| | | |
|---|---|---|
| 2007/0055555 A1 | 3/2007 | Baggett et al. |

FOREIGN PATENT DOCUMENTS

| | | |
|---|---|---|
| WO | WO 95/26007 | 9/1995 |
| WO | WO 01/61607 | 8/2001 |
| WO | WO 02/029672 | 4/2002 |

OTHER PUBLICATIONS

Travel Manager's Workstation, Travel Systems Institute, 1993, pp. 9-35.

Fee, John, "Through the Electronic Looking Glass into Living Pictures", Popular Science, Aug. 1981, pp. 68-70.

Yan, et al., "L-CATA: A Logic-Based Expert Travel System", Computer Science in Economics and Management 4; Aug. 1, 1991, pp. 151-163.

Yenckel, James, "Thrifty fliers find network of routes to fare deals", Chicago Sun Times, Feb. 17, 1991.

American Express unveils "American Express @ Work, new desktop portal for corporate travel & purchasing", by PR Newswire, Jul. 19, 1999.

Gerwig, Kate, "Online Corporate Traveler", InternetWeek, Sep. 14, 1998.

"American Express launches B2B travel booking technology for mid-sized companies", Canada Newswire, May 29, 2000.

"American Express launches online business travel fulfillment services", PR Newswire, Oct. 16, 2000.

Rogers, et al., "An adaptive interactive agent for route advice", ACM, 1999.

Friedman, et al., "Bias in computer systems", ACM, 1996.

Linden, et al., "Interactive assessment of user preference models: The automated travel assistant", white paper by the Department of Computer Science and Engineering, University of Washington, 1996.

Clemons, et al., "The Nature of Competition in Electronic Markets: An Empirical investigation of the electronic travel agent market", Wise, 1997.

Clemons, et al., "The Nature of Competition in Electronic Markets: An Empirical investigation of the electronic travel agent offerings", white paper by the Department of Operations and Information Management, The Wharton School, Jun. 1999.

Kowtko, et al, "Data collection and analysis in the air travel planning domain", DARPA Speech and Natural Language Workshop 1989.

Upton, Gill, "Deals on Wheels", Supply Management, Jan. 15, 1998.

"BookIt! Is the internet booking engine of choice for online travel reservations" PR Newswire, Feb. 17, 1999.

"British Airways: Fifty pluses take flight online", M2 Presswire, Feb. 26, 2001.

thefreedictionary.com website; Dec. 12, 2005; 1 page.

Orbitz website; Sep. 30, 2001, Wayback Machine web archive site, 1 page.

Travelocity website; Nov. 21, 2001, Wayback Machine web archive site, 2 pages.

Fichter and Cervone; Documents, Data Information Retrieval, & XML; document retrieval: difficulties of retrieving information from document repositories Online Nov. 1, 2000.

"Chapter 3—Memory Management", Linuxhq.com/guides/tlk/mm/memory.html, copyright 1996-1999.

"Memory Offset Annotation", tacc.utexas.edu/services/userguides/intel/ref/ann-mem.htm.

Clemons, Eric K., et al., Ahead of the Pack Through Vision and Hustle: A Case Study of Information Technology at Rosenbluth Travel, Proceedings of the Twenty-Fourth Annual Hawaii International Conference on System Sciences, vol. 4, Jan. 1991, pp. 287-296.

Greenberg, Ilan, Travelnet to help corporations stem travel expense tide InfoWorld, vol. 17, No. 29, Jul. 17, 1995, p. 25.

Rosenbluth International and AT&T to Provide Business New Travel Solution PR Newswire, Jul. 19, 1995.

Clemons, Eric K., et al., Rosenbluth International: Strategic Transformation of a Successful Enterprise Proceedings of the Thirty Second Hawaii International Conference on System Sciences, 1999.

DiFlorio, Dionino, et al., Air Deal Manager: American Express Provides an End to End Purchasing Management Solution SAS Conferences XVII SEUGI, Jun. 1999.

Rosenbluth International Files Suit Against Travel Analytics for Violation of Patent Infringement Laws, PR Newswire, Mar. 17, 2000.

Jones, David, Modeling Tools Mature, Business Travel News, vol. 18, Jan. 15, 2001.

Navigant International Launches Unique Internet-Accessible, Intuitive Reporting Platform, PR Newswire, Jan. 18, 2001.

DiFlorio, Diono, et al., Air Deal Manager: Corporate Travel Expense Optimisation with the SAS System SAS Converence XIX SEUGI, May-Jun. 2001.

Campbell, Jay, Dacoda opens for biz: Rosenbluth launches contract optimization service for non-clients, Business Travel News, vol. 18, No. 24, Nov. 12, 2001.

Simbologica Web Pages, Simbologica, http://www.simbologica.it, Oct. 2006.

Galileo.com, "Galileo International Subsidiary Quantitude, Inc. Begins Global Network Pullout," Jul. 31, 2000, http://galileo.com/galileo/en-us/news/Press/Released/Archive/1007/07/Quantitude+Roll+July+31+2000.htm.

Galileo International Inc. Annual Report (10-k) Item 1. Business Mar. 31, 2001, pp. 1-24.

"First Integrated Online Travel Management System Offers Cost Control, Compliance with Corporate Travel Policy: Sixth Largest Navigant International first Major User", Jul. 7, 1999, Baltimore-Business Wire, 1 pg.

Travelguidessoftware.com (Nov. 27, 1999) 12 pgs.

\* cited by examiner

SYSTEM AND METHOD FOR FACILITATING TRANSACTIONS AMONG CONSUMERS AND PROVIDERS OF TRAVEL SERVICES

CROSS-REFERENCE TO RELATED APPLICATIONS

The present application claims the benefit of, and priority to, U.S. Provisional Patent Application No. 60/428,062, entitled "TRAVEL INFORMATION DISTRIBUTION SYSTEM AND METHOD" and filed Nov. 21, 2002, and U.S. Provisional Patent Application No. 60/428,443, entitled "TRAVEL INFORMATION DISTRIBUTION SYSTEM AND METHOD" and filed Nov. 22, 2002; the entire contents of both of which are hereby incorporated by reference in their entirety. In addition, the present application claims priority to, and the benefit of, U.S. Nonprovisional patent application Ser. No. 10/217,666, entitled "INTEGRATED TRAVEL INDUSTRY SYSTEM" and filed on Aug. 12, 2002, and U.S. Nonprovisional patent application Ser. No. 10/188,768, entitled "SYSTEM AND METHOD FOR AIRLINE PURCHASING PROGRAM MANAGEMENT" filed on Jul. 2, 2002; the entire contents of both of which are also hereby incorporated by reference in their entirety.

FIELD OF INVENTION

The present invention generally relates to systems and methods for facilitating transactions. More specifically, the present invention relates to integrated travel industry systems and methods for facilitating transactions relating to time-sensitive services where information regarding available services may be displayed, transactions involving such available services may be facilitated, the inventory of available services may be updated, and commissions relating to such transactions may be distributed.

BACKGROUND OF THE INVENTION

During the last half of the twentieth century, and particularly the last twenty five years, many changes in the travel industry have occurred. For example, while options for transportation by train, automobile and boat have changed to a relatively minor extent, travel via aircraft has increased dramatically. Similarly, the number and variety of destinations and the venue and entertainment choices available at those locations have increased dramatically. These changes now provide consumers with a vast array of choices including their mode of transportation, the transporting carrier, their destinations, their accommodations, their meals, their local transportation, and their entertainment.

As the volume of such choices has increased, the need for collection and assimilation of data regarding the many variables involved has also shown significant growth. Simultaneously, as fast as the capabilities of computers and modern methods of communicating have been adapted and developed to satisfy that need, those capabilities have been consumed to accommodate an ever-increasing amount of available, useful information. As a result, as consumers and their agents engage in travel-related transactions, they may now consider many factors beyond the mere availability of travel products and services. Consumers may now make informed decisions based on any number of factors, and consumers have accordingly demanded increasing access to information.

For example, in selecting air travel, a consumer may now easily consider a large number of factors such as departure and/or arrival times, air carrier, aircraft model, seat location, whether a meal will be served, number of stops and/or layovers, elapsed flight time, safety record, whether a ticket is refundable or may be modified or transferred, advance-purchase requirements, incentives that may be included, on time performance, price, and/or other terms or conditions.

Similarly, in selecting accommodations at the destination, a consumer may consider specific room selection, room configuration, hotel location, rates, whether pets are allowed, and amenities such as views, pools, exercise facilities, fireplaces, stoves, microwave ovens, continental breakfast, happy hour, balconies, restaurants, shopping, in-room refrigerators, laundry services, and the like. In selecting local transportation and/or entertainment, a similar array of factors may also be considered. In fact, the factors that may be considered are limited by only the extent to which it is profitable and/or cost effective for a provider to collect and make available such information.

One significant result of the increase in both the supply of travel-related options and the demand for travel-related services has been the widespread proliferation of travel agencies and other travel information groups. As these agencies and groups have competed with each other for market share, they have sought access to large volumes of data as describe above, and they have also sought to maintain such data so that it is continuously complete and up-to-date (i.e., "real time" data). To accommodate this need, various technological advancements have been made with respect to integrated computer reservation systems and networks (i.e., CRSs) and the centralized database services (i.e., Global Distribution Systems or "GDSs"), with which they interface. For example, various computerized, network-based systems (e.g., Travelocity, the SABRE system, Amadeus, Galileo/Apollo, System One, and Worldspan) are currently available to enable travel agents, through a local computer, to interface with a GDS. Accordingly, these integrated systems facilitate access to information regarding available services, transactions involving such services, updating the inventory of available services, and distribution of commissions relating to such transactions.

While these trends may have increased consumer choice and produced market forces that have incented service providers to better meet consumer needs, they have also produced market advantages for GDS providers with superior access to information. Not all GDS providers that have superior access to such information, however, are disinterested. For example, it is often the case the basis for the superior access to information that a GDS provider enjoys is the result of its affiliation with (e.g., ownership by, control by, operation by, marketed by, under common control with) an air carrier or other travel-related service provider. As a result of such affiliations, decisions regarding which information or services to provide are often influenced by ethical and/or legal considerations as well as by considerations of practicality, efficiency, and/or consumer needs and desires. Moreover, while increased information and opportunity for consumer choice is usually to be desired, an optimum system requires the ability to consider in the final analysis the costs associated with providing that information and making those choices available.

By way of illustration, FIG. 1 shows an example of a prior art integrated computer reservation system 100 comprising a host 110 interfacing with a centralized database service 120, and a travel agent 130 in communication with a consumer 140. Database service 120 is affiliated with (e.g., owned by, controlled by, operated by, marketed by, under contract with, and/or under common control with) an air carrier 150 or other travel-related service provider. In accordance with this system, travel agent 130 may be the end user of the travel services, or may be working on behalf of consumer 140 to accomplish a transaction involving services 122 such as travel-related services. Such a transaction may involve a reservation, purchase, return, refund, transfer, modification or other agreement relating to transportation, lodging accommodations, food, entertainment or other time-sensitive products or services. Agent 130 is typically a neutral source of information about, or tickets for, travel-related services such as air transportation.

Once agent 130 has determined the travel needs of consumer 140, agent 130 may submit to host 110 a request 132 configured to solicit a relevant set of information 112 (i.e., a display), enabling agent 130 to select one or more suitable services 122. Database 120 may provide access to a large volume of information regarding schedules, availability (i.e., seats participating carriers hold out as available for sale on particular flights), fares, rules, on-time performance, or other service enhancements. Where database 120 is affiliated with a first carrier 150, carrier 150 may require that alternate carrier 160 pay a fee 162 to carrier 150 for incorporating data 161 into database 120. Ethical and legal considerations, however, often preclude database 120 from charging such "user fees" in a discriminatory manner and may also preclude a limit database 120 from receiving value from an alternate carrier 162 in exchange for hosting that carrier's data.

Where database 120 is affiliated with first carrier 150 and includes information regarding available services of first carrier 150 and alternate carrier 160, ethical and legal considerations often require that any display 112 provided by host 110 include the schedules, fares, rules and availability of all carriers whose data is hosted by database 120, including carrier 150 and any other one or more alternate carriers 160. Those same ethical and legal considerations may also require that all displays 112 provided by host 110 offer the same functions or enhancements offered for all agents 130, without regard for the particular information requirements of a specific agent 130. For example, where database 120 is affiliated with carrier 150 and hosts data for alternate carrier 160, it may be necessary for database 120 to ensure that the displays 112 provided by database 120 and host 110 include the same editing and ranking criteria without regard for the type of connection (e.g., on-line or interline) between host 110, database 120 and agent 130. It may also be necessary for database 120 to ensure that each display 112 that database 120 enables host 110 to offer either use elapsed time as a significant factor in selecting service options from the database or give single-plane flights a preference over connecting services in ranking services. In addition, it may be necessary for database 120 to ensure that any service enhancements it offers to carrier 150 are also available to alternate carriers 160 on nondiscriminatory terms. Further, database 120 may be precluded from including certain types of default displays that might automatically prefer one or more carrier 150 over an alternate carrier 160.

After requesting and viewing one or more displays, agent 130 may select a suitable service and may communicate to host 110 a request or order 134 configured to reserve that suitable service in the name of consumer 140. Host 110 may then facilitate the updating of database 120 to reflect the reservation, sending to consumer 140 or agent 130 indicia of the service (or the service itself) 122 (e.g., an e-mail, a confirmation number, an itinerary, a paper ticket, a boarding pass, physical admission), payment for service 122 by or on behalf of consumer 140 or agent 130, and distribution of commissions among agent 130 and database 120. Typically, this distribution of commissions includes a commission 162 transferred from carrier 150 or alternate carrier 160 to database 120, an incentive 151 transferred from database 120 either directly to agent 130 or, alternatively, through host 110 as incentive 111, and a booking fee 131 transferred from agent 130 to booking engine 170. Accordingly, system 100 facilitates the provision of a display 112 that includes information regarding available services, the performance of transactions involving such available services, the updating of the inventory of available services, and the distribution of commissions relating to such transactions.

Presently known systems do not adequately address the situation in which a particular method of accessing or presenting information is desirable to one carrier, yet detrimental or otherwise contrary to the interests or desires of another. Similarly, where a first agent or a first consumer may desire to utilize a first set of capabilities, a second agent or consumer may desire a different set of capabilities. One consumer might wish to search information regarding a large number of carriers or even all carrier data (or other parameter(s)), while another consumer desires to view only a subset of available data. Consumers or agents accessing only a small fraction of available data and requiring very simple or basic functionality may find it undesirable to pay fees which are a function of many different consumers and agents having more complex needs. It follows, then, that the needs and desires of such "low-end" users may tend to discourage the development and incorporation of improvements and enhancements more useful to "high-end" users because those improvements and enhancements may increase the costs of the system. With Global Data Systems, as with many things, one size (e.g., one set of data, one fixed fee) may not fit (i.e., be suitable for) all users.

SUMMARY OF THE INVENTION

The present invention addresses many of the shortcomings of the prior art by providing integrated, flexible systems and methods for facilitating transactions among consumers and providers of travel services. In accordance with various aspects of the invention, so called products and "low-end" users having relatively straight-forward travel needs may be accommodated with a low-cost, right-sized set of capabilities. At the same time, various embodiments of the invention may be utilized to suit differing needs and desires of other users. As the invention facilitates the satisfaction of differing needs and desires of varying users, appropriate fees, costs, and other terms may be negotiated and/or differentiated, thereby allowing market forces to cause rational economic decisions to be made considering both the costs and benefits of the specific embodiment that is chosen and the specific circumstances in which it is to be used.

In a first aspect, a system for facilitating transactions among consumers and providers of travel-related services comprises a technology provider and a host. In accordance with this embodiment, the technology provider, which is configured to operate independently from any particular provider of travel-related services, facilitates the receipt, maintenance and provision of information regarding available travel-related services. The host is in communication with the technology provider, an agent, and one or more providers of travel-related services. The host is also configured to receive a request from the agent, retrieve one or more displays from the technology provider in accordance with the request, present one or more of those displays to the agent, and to facilitate a transaction between the consumer and the provider of travel-related services.

In an exemplary embodiment, the host comprises a booking engine configured for facilitating the transaction involving the agent and the provider of travel-related services. In accordance with this embodiment, the booking engine is configured for receiving an order from the agent, which order is configured for reserving a travel related service in on behalf of a consumer. The booking engine may then facilitate updating a database to reflect the reservation of the service and, as appropriate, to facilitate a reduction in the inventory of available services. The booking engine may also facilitate sending to the consumer or agent information or indicia sufficient to enable the consumer to utilize the service. In addition, the booking engine may be configured for receiving a payment from or on behalf of the consumer or the agent. Finally, the booking engine may be configured for effecting the distribution of fees and commissions among the agent and provider. In an exemplary embodiment, the booking engine may be configured for facilitating payment, from the agent to the carrier, of a fee for the service. In addition, the booking engine may also be configured for facilitating payment, from the carrier to the host, of a commission for facilitating the transaction. Finally, the host may be configured for facilitating payment of fees to the technology provider, the agent, and the booking engine to reconcile ("settle") the transaction.

A typical display includes information content requested by the agent that is available from technology provider. An exemplary display may also comprise various formats in which the information content may be presented to agent. In this regard, the information content may comprise, for example, information relating to available inventory of travel services from a predefined carrier within a predefined time period. In an exemplary embodiment, the display may also be configured to exclude selected information. In accordance with this embodiment, display may be configured to exclude information, for example, regarding available inventory from one or more predefined carriers or in accordance with one or more predefined or user-selected parameters, such as on-time performance. Cost, or the like, in addition, the information format may be configured for presenting information in accordance with one or more predefined or user-selected presentation or editing criteria, such as ranking or prioritization by preferred carrier or other desired parameters.

In accordance with another aspect of the invention, an exemplary method for facilitating transactions among consumers and providers of travel services comprises the steps of receiving, by an independent technology provider, information regarding available travel-related services; receiving, by the host, a request from an agent; retrieving, by the host, information be displayed from the technology provider; presenting one or more displays incorporating the retrieved information to an agent; and facilitating a transaction between the consumer and the provider of travel-related services.

In an exemplary embodiment, the step of facilitating the transaction among the consumer and are or more providers of travel-related services may be performed by the host using a dedicated server operating a booking engine and may comprise the steps of receiving, from an agent, an order or other request configured for reserving a service in the name of or otherwise on behalf of a consumer; facilitating updating of a database to reflect the reservation of the service; facilitating a reduction of an inventory, maintained on a database, of available services; sending to the agent (or other requesting party, e.g., the consumer) information or indicia sufficient to enable the end-user to utilize the service; receiving a payment from or on behalf of the agent; and effecting the distribution of user fees, incentives, commissions, and the like, among various parties such as the agent, the service provider(s) and the consumer. In an exemplary embodiment, the distribution of fees may comprise payment, from the agent to the carrier, of a fee for the service; payment, from the carrier to the host, of a commission for facilitating the transaction; and payment, to one or more of the technology provider(s), agent(s), and the booking engine (e.g., the host), of fees to settle the transaction.

In an exemplary embodiment the step of retrieving information from the technology provider may comprise retrieving and/or more displays from the technology providers, specifying or otherwise defining information or content, and may also comprise selecting one or more display formats. Moreover, the step of presenting one or more displays may comprise excluding information that has been defined or selected for exclusion.

BRIEF DESCRIPTION OF THE DRAWINGS

A more complete understanding of the present invention may be facilitated by derived by referring to the following detailed description considered in connection with the following drawings, in which like numerals represent like elements and in which.

DETAILED DESCRIPTION OF EXEMPLARY EMBODIMENTS

The present invention provides various integrated, flexible systems and improved methods for facilitating transactions among consumers and providers of travel services. In accordance with various aspects of the invention, various users having different needs and desires may be accommodated without regard to whether or how each user's requirements compare to those of other users. As a result, various system configurations, displays, and methods may be implemented to suit the needs of different users while allocating costs to those individual users in accordance with the terms and conditions applicable to the parties. As discussed more fully below, the present invention thereby provides many improvements over prior art systems including, but not limited to, the ability of travel industry participants to more-efficiently meet the needs of their clients and allowing market forces to cause rational economic decisions to be made, considering both the costs and the benefits of the specific embodiments that are implemented and the specific circumstances in which they are to be used.

Figure 1:
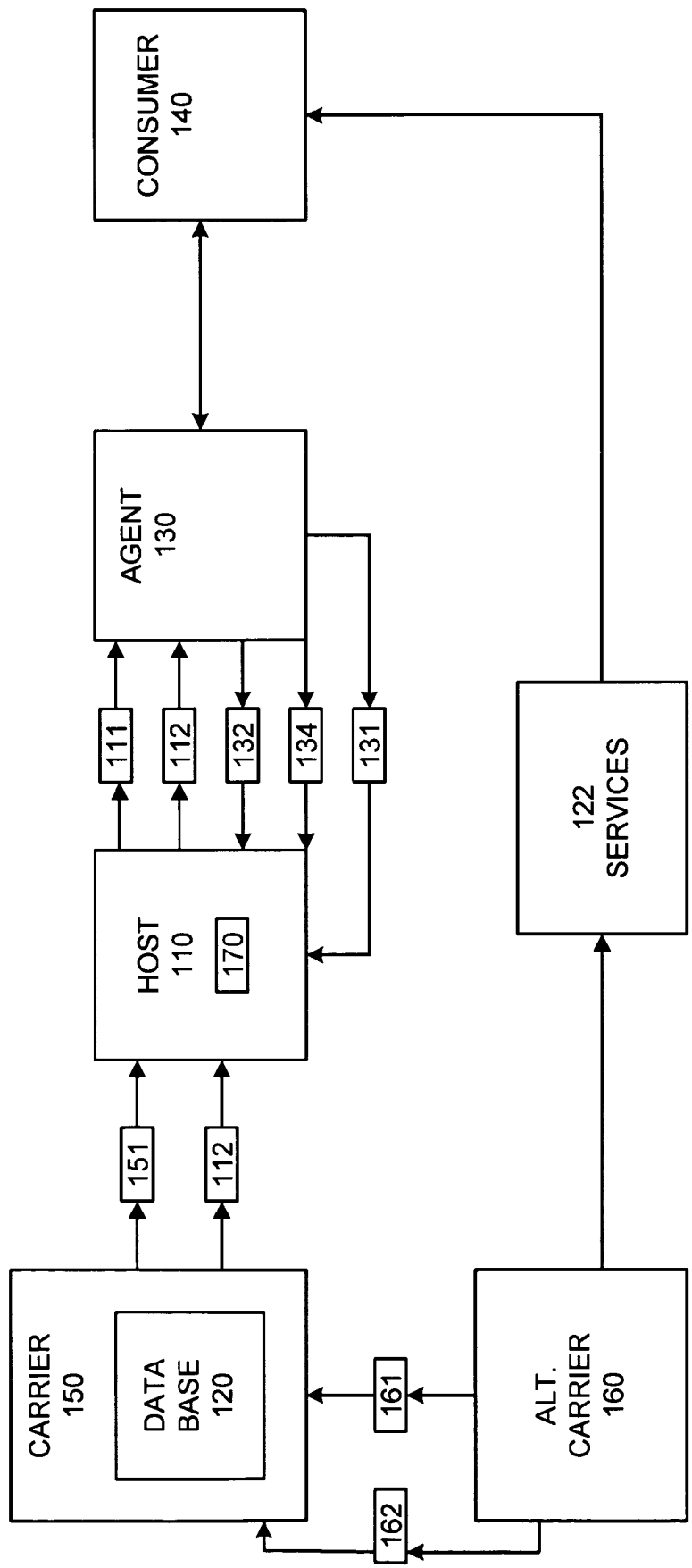
FIG. 1 illustrates a schematic diagram of prior art travel industry system.
Figure 2:
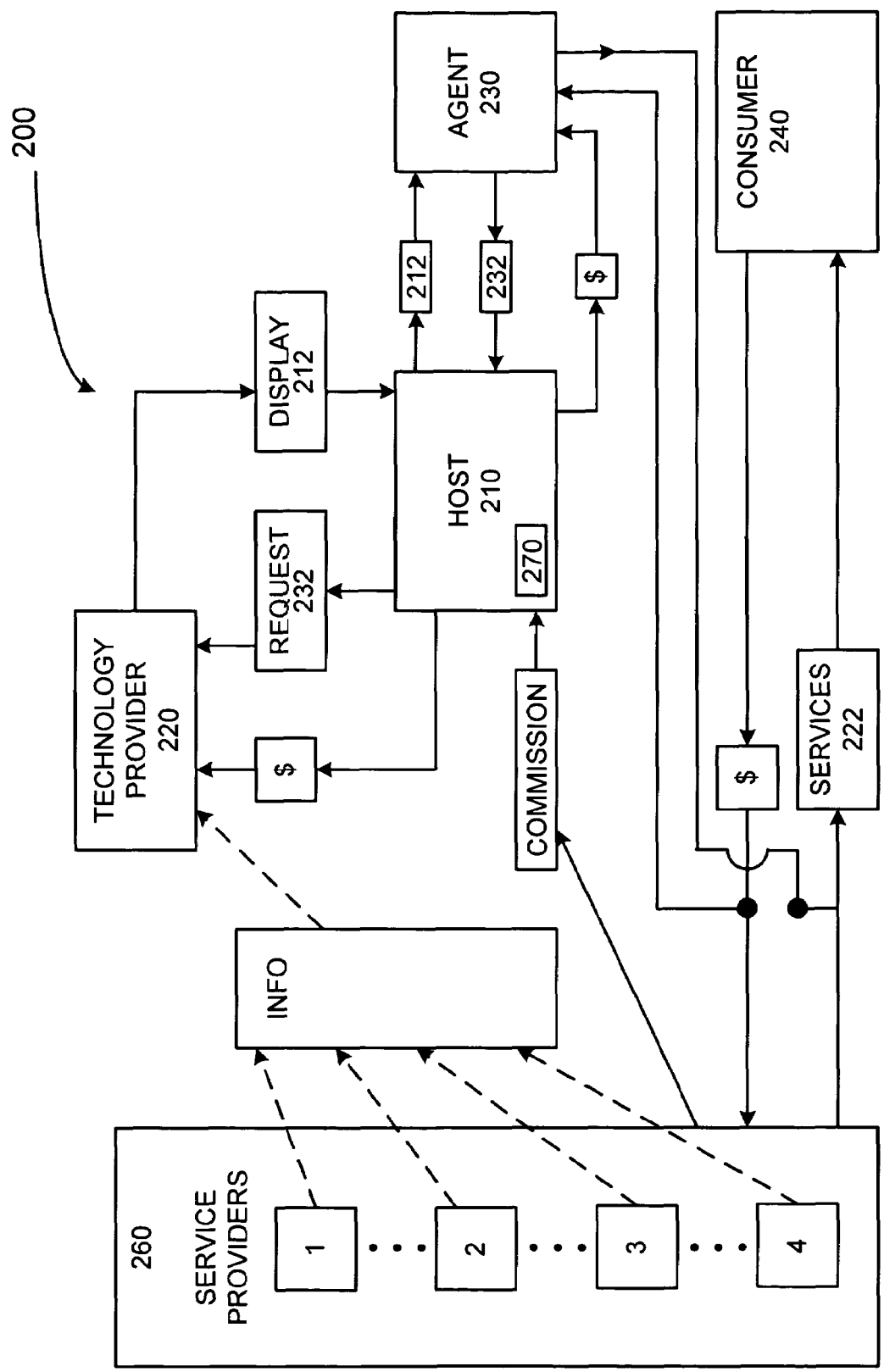
FIG. 2 illustrates a schematic diagram of a system for facilitating transactions among consumers and providers of travel services in accordance with an embodiment of the present invention.

FIG. 2 illustrates a schematic diagram of a system 200 for facilitating transactions among consumers 240 and providers of travel-related services 260 in accordance with one embodiment of the present invention. System 200 comprises a technology provider 220 and a host 210. Technology provider 220 is configured to communicate with host 210, and host 210 is configured to communicate with an agent 230 and one or more providers of 260 travel-related services.

Technology provider 220 is configured for facilitating the receipt, maintenance and provision of information regarding available travel-related services 260. Technology provider 220 may be configured to obtain and maintain its data in any convenient manner. For example, it may periodically "ping" remote servers, receive or retrieve batch data at predetermined intervals, operate in an interrupt mode to receive significant updates, maintain communication links with one or more service providers 260 to facilitate real time updates, or the like.

In accordance with a preferred embodiment, technology provider 220 may be configured to operate independently from any particular provider of travel-related services 260, i.e., Technology provider 220 is not affiliated with (e.g., ownership by, control by, operation by, marketed by, under common control with) any particular carrier or other travel-related service provider. Alternatively, technology provider 220 may be affiliated with one or more service providers and/or agents, and may be configured to prioritize or exhibit preferences for one or more service providers according to predetermined criteria. Regardless of whether technology provider 220 is affiliated with any service providers or agents, technology provider 220 may be configured to implement any desired preference schedules, or to implement no preferences at all.

In operation, host 210 is in communication with technology provider 220, agent 230, and one or more providers of travel-related services 260. Host 210 is also configured for receiving a request 232 from agent 230, for retrieving one or more displays 212 (or data to be displayed) from technology provider 220 in response to the request 232, for presenting one or more of those displays 212 to the agent 230, and for facilitating a transaction between the consumer 240 and the provider of travel-related services 260.

Communication among the parties in accordance with the present invention may be accomplished through any suitable communication protocol, such as, for example, those utilized by a telephone or telephone network, a touch-tone telephone, a two-way pager, a reply pager, a home computer, a personal computer, a personal communication device, a personal communication services device, a digital communications device, a television, an interactive television, a digital television, a personal digital assistant, a display telephone, a video telephone, a watch, a cellular telephone, a wireless telephone, a mobile telephone, a display cellular telephone, a facsimile machine, Intranet, Internet, point of interaction device (point of sale device, personal digital assistant, cellular phone, kiosk, etc.), online communications, off-line communications, wireless communications, local area network (LAN), wide area network (WAN), networked or linked devices, or the like. One skilled in the art will also appreciate that any communication across a network may be achieved using web services technology, including but not limited to SOAP, WSDL, UDDI. One skilled in the art will also appreciate that, for security reasons, any databases, systems, devices, servers, or other components of the present invention may consist of any combination thereof at a single location or at multiple locations, wherein each database or system includes any of various suitable security features, such as firewalls, access codes, encryption, decryption, compression, decompression, or the like.

To simplify the description of the invention herein, various embodiments of the invention are described as pertaining to a system for facilitating communication among, for example, a consumer 240, an agent 230, a host 210, a booking engine 270 which may be integrated with host 210 or which may be separate from host 210, as desired, a technology provider 220, and a provider of travel-related services 260 using a computer network. It should be appreciated that the computing units may be connected with each other via a data communication network. If the network is in the nature of a public network, it may be advantageous to presume to network, it may be advantageous to presume the network to be insecure and open to eavesdroppers. For example, the network may compromise the Internet. In this context, the computers may or may not be connected to the internet at all times. For instance, the computer of the host 210 and/or the computer of agent 230 may employ a modem to occasionally connect to the internet, whereas technology provider 220 or travel-related service provider computing center may maintain an intermittent or permanent connection to the internet. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) the contents of which are hereby incorporated by reference.

The various computers associated with agent 230, consumer 240, host 210, technology provider 220, and travel-related service provider 260 are suitably interconnected via a network, referred to as a transaction network. The transaction network may compromise presently known proprietary networks for use with on-line transactions, such as transactions for credit cards, debit cards, and other types of financial/banking card transactions. The transaction network is a preferably closed network and may be assumed to be secure from eavesdroppers. Exemplary transaction networks may include the American Express®, VisaNet® and the Veriphone® networks.

The parties may interact with the system via any input device such as a keyboard, mouse, kiosk, personal digital assistant, handheld computer (e.g., Palm Pilot®), cellular phone, any suitable communication or data input modality.

The various systems components may be suitably coupled to the transaction network via data links including a variety of communications media and protocols such as, for example, a connection to an Internet Service Provider (ISP) over the local loop as is typically used in connection with standard modem communication, cable modem, Dish networks, ISDN, Digital Subscriber Line (DSL), or various wireless communication methods. Travel-related service provider systems may reside within a local area network (LAN) which interfaces to the transaction network via a leased line (T1, D3, etc.) or other desired communication methods. See, e.g., Gilbert Held, Understanding Data Communications (1996), hereby incorporated by reference.

In on-line implementations of the instant invention, each participant is equipped with a computing device. Agent 230 may be equipped with a computing unit in the form of a personal computer, although other types of computing units may be used including laptops, notebooks, hand held computers, set-top boxes, touch-tone telephones, and the like. Host 210 may be equipped with a computing unit such as a computer-server, although other implementations are contemplated by the invention. Technology provider 220 and travel-related service provider 260 each may be implemented as a computer, which may be a main frame computer or which may be implemented in other forms, such as mini-computers, PC servers, a network of computers or the like.

System 200 may also include a suitable website or other Internet-based graphical user interface which is accessible by users. In one embodiment, the Internet Information Server, Microsoft Transaction Server, and Microsoft SQL Server, may be used in conjunction with the Microsoft operating system, Microsoft NT web server software, a Microsoft SQL database system, and a Microsoft Commerce Server. Additionally, components such as Access Sequel Server, Oracle, MySQL, Interbase, etc., may be used to provide an ADO-compliant database management system. The term "webpage" as it is used herein is not meant to limit the type of documents and applications used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

The various servers employed in the system of the present invention may comprise any suitable hardware, software, and networking components to provide an appropriate interface to a network. In addition, the servers may be configured to manage databases such as, for example, the database of technology provider 220. In one embodiment, servers may include Sun Ultra SPARC Enterprise 250 and 450 servers which may be used in conjunction with a Sun Solaris 7 or Linux operating system, Apache web server software, and an Oracle 8 or MySQL database system. Of course, particular hardware and software components used in servers may vary widely from embodiment to embodiment. Furthermore, servers may represent a "cluster" or group of separate computer systems providing the functionalities described herein.

A variety of conventional communications media and protocols may be used for the various data links. Such links might include, for example, a connection to an Internet Service Provider (ISP) over a local loop as is typically used in connection with standard modem communication, cable modem, Dish networks, ISDN, Digital Subscriber Line (DSL), or various wireless communication methods. In addition, various system components may independently, separately, or collectively, reside within a local area network (LAN) which interfaces to network via a leased line (T1, D3, etc.). See, e.g., GILBERT HELD, UNDERSTANDING DATA COMMUNICATIONS (1996), hereby incorporated by reference.

In an exemplary system, technology provider 220 includes a database which may compromise a plurality of data sectors for maintaining data relating to an inventory of available travel-related services 260. Such information may include, for example, in the case of air travel, departure and/or arrival times, air carrier, aircraft model, seat location, whether a meal will be served, number of stops and/or layovers, elapsed flight time, safety record, whether a ticket is refundable or may be modified or transferred, advance-purchase requirements, incentives that may be included, on time performance, price, and/or other terms or conditions. Such information may also include, for example, in the case of lodging, specific room selection, room configuration, hotel, motel, resort, and other venue locations, rates, whether pets are allowed, and amenities such as views, pools, exercise facilities, fireplaces, stoves, microwave ovens, continental breakfast, happy hour, balconies, restaurants, shopping, in-room refrigerators, laundry services, and the like. In selecting other travel products and services such as local transportation and/or entertainment, a similar array of factors may also be considered.

Various service provider databases useful in the system of the present invention may include graphical, hierarchical, relational, object-oriented or other database configurations and may be maintained on a local drive, a local server, or on a separate computer coupled to a server via a local area or other network. In one embodiment, the database may be a collection of ASCII or other text files stored on a local drive of a server. Subsidiary account information may be suitably retrieved from the database and provided to a participant, upon request via a server application, as described more fully below. Common database products that may be used to implement the databases include DB2 by IBM (White Plains, N.Y.), various database products available from Oracle Corporation (Redwood Shores, Calif.), Microsoft Access by Microsoft Corporation (Redmond, Wash.), or any other suitable database product.

Moreover, the travel service databases may be organized in any suitable manner, for example as data tables or lookup tables. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in preselected databases or data sectors.

More particularly, a "key field" partitions the database according to the high-level class of objects defined by the key field. For example, certain types of data may be designated as a key field in a plurality of related data tables, and the data tables may then be merged on the basis of the type of data in the key field. In this regard, the data corresponding to the key field in each of the merged data tables is preferably the same or of the same type. However, data tables having similar, though not identical, data in the key fields may also be merged by using AGREP, for example.

Referring again to FIG. 2, host 210 comprises a booking engine 270 configured to facilitate the transactions among one or more agents 230 and one or more providers 260 of travel-related services. In accordance with one embodiment, the booking engine 270 compromises a software of firmware module, routine, or the like configured to receive a request (e.g., an order) from agent 230 inquiring about or for reserving a service for the benefit of consumer 240. The booking engine may then facilitate a database update to reflect the reservation of the service and, as appropriate, to facilitate a reduction of the inventory of available services. The booking engine 270 may also facilitate transmitting confirmation information or indicia to consumer 240 or agent 230 sufficient to enable consumer 240 to confirm the reservation or to enjoy the service.

In addition, the booking engine 270 may be configured for receiving a payment from or on behalf of consumer 240 or agent 230. Finally, the booking engine 270 may be configured for effecting the distribution of fees or commissions to agent 230 and service provider(s) 260. In an exemplary embodiment, booking engine may be configured for facilitating payment, from agent 230 to the service provider (e.g., carrier), of a fee for the service. In addition, the booking engine may also be configured to facilitate payment, from the carrier to the host 210, of a commission for facilitating the transaction. Finally, host 210 may be configured to facilitate payment of fees to technology provider 220, agent 230, and the booking engine (e.g., host 210) to settle (i.e., reconcile) the transaction.

In accordance with a further aspect of the present invention, the term "host" contemplates the hosting functions described herein. In addition, the term "host" as used herein refers to the type of company, institution, or organization which performs the hosting function, such as data management institutions, search engines, internet service providers, banks, credit card transaction card and companies, card sponsoring companies, and third party issuers under contract with such financial and information institutions. It should also be noted that other participants may be involved in some phases of transactions related to facilitation of transactions involving the accounts, such as one or more intermediary settlement institution, but these participants are not shown in the drawings.

Host 210 may include any suitable combination of hardware and software components configured to allow an agent 230 to communicate with the host over the network. For example, host 210 might may include a standard personal computer (PC) comprising a CPU, monitor, storage, keyboard, mouse, and communication hardware appropriate for the given data link (e.g., V.90 modem, network card, cable modem, etc.). In alternate embodiments, host 210 may be a personal data assistant (PDA) capable of manipulating images and communicating with technology provider 220. Host 210 may typically include an operating system (e.g., Windows 95/98/2000, Linux, Solaris, MacOS, and/or the like) as well as various conventional support software modules and drivers typically associated with such computers. Host 210 may also include application software configured to communicate over a network with technology provider 220 agent 230. For example, one such application software may include a world wide web (WWW) browser or other suitable communication software. In an exemplary embodiment, host 210 includes a conventional Internet browser application that operates in accordance with appropriate (e.g., HTML and HTTP) protocols such as Netscape Navigator (available from the Netscape Corporation of Mountain View, Calif.) or Microsoft Internet Explorer (available from the Microsoft Corporation of Redmond, Wash.).

As those skilled in the art will appreciate, the computer associated with agent 230 may include an operating system (e.g., Windows NT, 95/98/2000, Linux, Solaris, etc.) as well as various conventional support software and drivers typically associated with computers. The invention, however, may also be implemented in conjunction with any suitable personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention may be implemented with TCP/IP communications protocols, the invention may also be implemented using IPX, Appletalk, IP-6, NetBIOS, OSI or any number of existing or future protocols. The system contemplates the use, sale or distribution of any goods, services or information over any network having similar functionality described herein. Computers can be in a home or business environment with access to the transaction network.

The various system components discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include data regarding the host, agent 230, the booking engine, consumer 240, travel-related service provider data, financial institution data and/or like data useful in the operation of the present invention. Limitations, data, or restrictions, requests, and the like, may be communicated to a host via any suitable network, email, webpage, voice response unit or customer service line via customer service representatives. Such information and data may also be transmitted to the host via one or more of a telephone, a touch-tone telephone, a two-way pager, a reply pager, a home computer, a personal computer, a personal communication device, a personal communication services device, a digital communications device, a television, an interactive television, a digital television, a personal digital assistant, a display telephone, a video telephone, a watch, a cellular telephone, a wireless telephone, a mobile telephone, a display cellular telephone, and a facsimile machine.

Agent 230 may include a network of point of sale devices, configured to communicate with host 210. In this context, a point of sale device may be any device suitable for receiving, processing, transmitting, and/or displaying data or information.

Access to the benefits of the system, and financial transfers or payments made in connection with transactions facilitated by the system, may themselves be facilitated through use of an account number or other information which identifies a user or a financial or other account of a user. An "account number," as used herein, includes any device, code, or other identifier and/or indicia suitably configured to allow a consumer 240 or agent 230 to access, interact with, or communicate with the system such as, for example, one or more of an authorization/access code, a personal identification number (PIN), an Internet code, other identification code, and/or the like which may optionally be located on or associated with a rewards or incentives card, charge card, credit card, debit card, prepaid card, telephone card, smart card, magnetic stripe card, bar code card, or an associated account. Such an account number may be distributed and stored in any form of plastic, electronic, magnetic, and/or optical device capable of transmitting or downloading data from itself to a second device.

An agent 230 or consumer 240's account number may be, for example, a sixteen-digit credit issuer's identifier such as a credit card number, although each credit provider has its own numbering system, such as the fifteen-digit numbering system used by American Express. A participating party's access code (e.g., credit card number) may comply with a standardized format such as a sixteen-digit format using four spaced sets of numbers (e.g., as represented by the number "0000 0000 0000 0000"). In an exemplary embodiment, the first five to seven digits may be reserved for processing purposes and identify the issuing bank, card type, etc. In this example, the last (sixteenth) digit may be used as a sum check for the sixteen-digit number. The intermediary eight-to-ten digits may be used to uniquely identify consumer 240 or agent 230.

An exemplary display 212 comprises information content displayed, e.g., on a screen or monitor, for viewing by agent 230, and which is retrieved from technology provider 220. In an exemplary embodiment, a display 212 may be presented in printed form or on a monitor or led device. An exemplary display 212 may also comprise an information format in which the information content may be presented to agent 230. In accordance with this embodiment, the information content may comprise, for example, information regarding available inventory from one or more carriers within a predefined time period. In accordance with this aspect of the invention, the display 212 may also be configured to exclude information that has been selected for exclusion. For example, the display 212 may be configured to exclude information, for example, regarding available inventory from one or more predefined carriers or regarding one or more predefined parameters, such as on-time performance. In addition, the information format may be configured to present information in accordance with one or more predefined editing or ranking criteria, such as by preferred carrier or other discriminatory criteria.

In conjunction with the facilitation of a transaction, the system 200 may be configured to administer or coordinate with one or more reward or loyalty programs. For more information on loyalty systems, transaction systems, electronic commerce systems and digital wallet systems, see, for example, U.S. patent application Ser. No. 09/836,213, filed on Apr. 17, 2001 by inventors Voltmer, et al. and entitled System And Method For Networked Loyalty Program; U.S. Continuation-In-Part patent application Ser. No. 10/027,984 was filed on Dec. 20, 2001 by inventors Ariff, et al. and is entitled System And Method For Networked Loyalty Program; U.S. Continuation-In-Part patent application Ser. No. 10/010,947 filed on Nov. 6, 2001 by inventors Haines, et al. and entitled System And Method For Networked Loyalty Program; U.S. Continuation-In-Part patent application Ser. No. 10/084,744 filed on Feb. 26, 2002 by inventors Bishop, et al. and entitled System And Method For Securing Data Through A PDA Portal; the Shop AMEX™ system disclosed in U.S. Patent Application Ser. No. 60/230,190 filed Sep. 5, 2000; the MR as Currency™ and Loyalty Rewards Systems disclosed in U.S. Patent Application Ser. No. 60/197,296 filed on Apr. 14, 2000; U.S. Patent Application Ser. No. 60/200,492 filed Apr. 28, 2000; U.S. Patent Application Ser. No. 60/201,114 filed May 2, 2000; the digital wallet system disclosed in U.S. patent application Ser. No. 09/652,899 filed Aug. 31, 2000; the stored value card disclosed in U.S. patent application Ser. No. 09/241,188 filed on Feb. 1, 1999; the system for facilitating transactions using secondary transaction numbers disclosed in U.S. patent application Ser. No. 09/800,461 filed on Mar. 7, 2001, and also in related provisional U.S. Patent Application Ser. No. 60/187,620 filed Mar. 7, 2000, Ser. No. 60/200,625 filed Apr. 28, 2000 and Ser. No. 60/213,323 filed May 22, 2000, all of which are herein incorporated by reference. Other examples of online membership reward systems are disclosed in Netcentives U.S. Pat. No. 5,774,870, issued on Jun. 30, 1998, and U.S. Pat. No. 6,009,412, issued on Dec. 29, 1999, both of which are hereby incorporated by reference.

It should be noted that same aspects of the system 200 of the present invention may at times require acquisition, authentication, or verification of the identity of agent 230 or consumer 240. Host 210 may accomplish the process of obtaining, authenticating, and/or verifying the identity of agent 230 or consumer 240 through a variety of methods known in the art including, but not limited to, the use of private databases, credit bureau databases, transmission of biometric data, transmission of "hand-shake" data (i.e., smart card signature, challenge/response, etc), PKI, and digital certificates, and/or the like. Examples of online authentication are disclosed in U.S. Ser. No. 09/952,490 "Microchip-Enabled Online Transaction System", filed Aug. 16, 2001, by inventors Anant Nambiar and Geoffrey Stem, which is hereby incorporated by reference.

Figure 3:
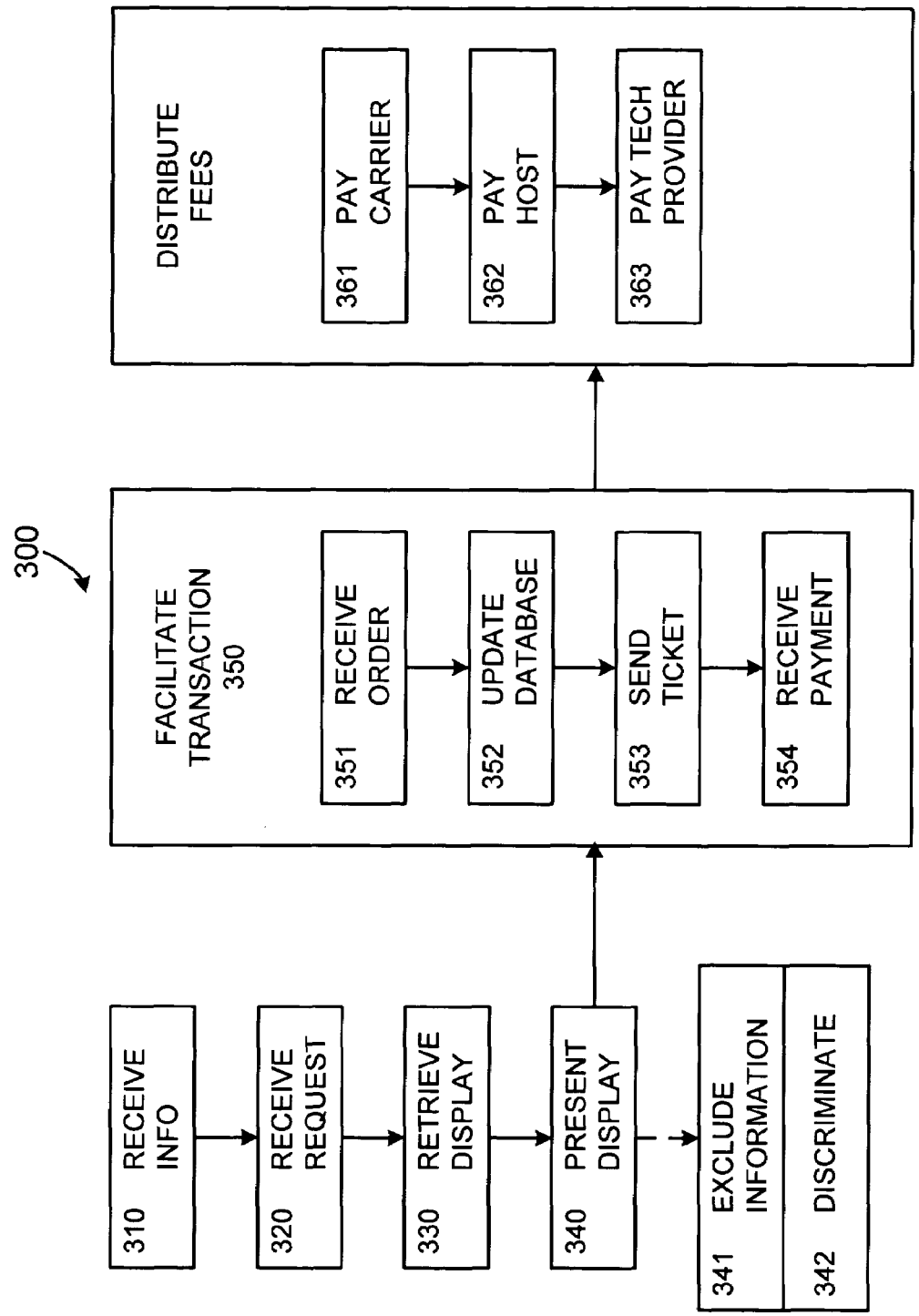
FIG. 3 illustrates a flow diagram of an exemplary method for facilitating transactions among consumers and providers of travel services in accordance with an embodiment of the present invention.

Referring now to FIG. 3 a flow diagram 300 of an exemplary method 300 for facilitating transactions among consumers and providers of travel services in accordance with the present invention is shown. An exemplary method 300 suitably compromises the steps of receiving, by an independent technology provider 220, information regarding available travel-related services (step 310); receiving, by the host, a request from an agent 230 (step 320); retrieving, by the host, one or more displays from the technology provider 220 (step 330); presenting one or more of those displays to an agent 230 (step 340); and facilitating a transaction among the consumer and the provider of travel-related services 260 (step 350).

In an exemplary embodiment, the step of facilitating the transaction (step 350) among the consumer and the provider of travel-related services 260 may be performed by a dedicated booking engine 270 and may comprise the steps of receiving, from agent 230, an order seeking to secure service in the name of a consumer (step 351); causing updating of a database to reflect the reservation of the service (e.g., facilitating a reduction of an inventory, maintained on a database, of available services 260 (step 352); sending to agent 230 information or indicia sufficient to enable consumer to enjoy service (step 353); receiving a payment from or on behalf of agent 230 (step 354); and effecting distribution of fees and commissions among agent 230 and provider (step 360). In an exemplary embodiment, the step of effecting distribution of fees (step 360) may comprise facilitating payment, from the agent 230 to the carrier, of a fee for the service (step 361); facilitating payment, from the carrier to the host, of a commission for facilitating the transaction (step 362); and facilitating payment, to one or more of the technology provider 220, the agent 230, and the booking engine 270, of fees to settle the transaction (step 363).

In an exemplary embodiment the step of retrieving one or more displays 212 from the technology provider 220 (step 330) may comprise defining an information content and may also comprise defining an information format. The step of presenting one or more of those displays (step 340) may comprise the step of excluding information that has been specifically selected for exclusion (step 341) and may also include discriminating between pieces of information based on one or more predefined basis such as carrier identity or any other basis described herein (step 342). Such discrimination may be used to modify the format and/or content of the data as it is presented (step 340).

In the foregoing specification, the invention has been described with reference to specific embodiments. However, it will be appreciated that various modifications and changes can be made without departing from the scope of the present invention as set forth in the claims below. For example, various processing steps may be combined or eliminated as required, such as for example, updating an available inventory prior to dispatching a ticket to the consumer. Further, various system elements described herein may be eliminated, and various steps may be performed by one or more of the elements described herein, such as for example, permitting the technology provider 220 to communicate directly with a consumer independently of a POS device. In addition, other suitable elements may be substituted for the elements described herein, or inserted between the connecting lines of the embodiments set forth, without departing from the scope of this invention. Further still, the specification and figures are to be regarded in an illustrative manner, rather than a restrictive one. As such, any modifications resulting in a system which is suitable for practicing the invention are intended to be included within the scope of the invention. Accordingly, the scope of the invention should be determined by the appended claims and their legal equivalents, rather than by the examples given above. For example, the steps recited in any of the method or process claims may be executed in any order and are not limited to the order presented in the claims.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. For a basic introduction of cryptography, please review a text written by Bruce Schneier, which is entitled "Applied Cryptography: Protocols, Algorithms, And Source Code In C," published by John Wiley & Sons (second edition, 1996), which is hereby incorporated by reference.

Other systems that may be integrated with, or layered on, the present invention include, for example, other loyalty systems, transaction systems, electronic commerce systems and digital wallet systems such as, for example, the Shop AMEX™ system as disclosed in Ser. No. 60/230,190 filed Sep. 5, 2000; the MR as Currency™ and Loyalty Rewards Systems disclosed in Ser. No. 09/834,478 filed on Apr. 13, 2001; a Digital Wallet System disclosed in U.S. Ser. No. 09/652,899 filed Aug. 31, 2000; a Stored Value Card as disclosed in Ser. No. 09/241,188 filed on Feb. 1, 1999; a System for Facilitating Transactions Using Secondary Transaction Numbers disclosed in Ser. No. 09/800,461 filed on Mar. 7, 2001; Methods and Apparatus for Conducting Electronic Transactions disclosed in Ser. No. 60/232,040 filed Sep. 12, 2000, all of which are hereby incorporated by reference. Other examples of online reward or incentive systems are disclosed in U.S. Pat. No. 5,774,870, issued on Jun. 30, 1998, and U.S. Pat. No. 6,009,412, issued on Dec. 29, 1999, both of which are hereby incorporated by reference. Additional information relating to smart card and smart card reader payment technology is disclosed in Ser. No. 60/232,040, filed on Sep. 12, 2000, and U.S. Pat. Nos. 5,742,845; 5,898,838 and 5,905,908, owned by Datascape; which are hereby incorporated by reference. Moreover, additional information related to online privacy and anonymity systems may be found at www.PRIVADA.COM, which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, and application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

As will be appreciated by one of ordinary skill in the art, the present invention may be embodied as a method, a data processing system, a device for data processing, an integrated circuit, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create system and method for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of system and method for performing the specified functions, combinations of steps for performing the specified functions, and program instruction for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A system for facilitating a transaction among a consumer and a provider of travel-related services comprising:
    a booking engine in communication with a technology provider, wherein said technology provider is in communication with a provider of travel-related services, and wherein said technology provider is configured to operate independently from said provider of travel-related services and said booking engine to minimize updates for said booking engine, and wherein said technology provider is configured to facilitate receipt, maintenance and provision of information regarding available travel-related services, wherein said technology provider retrieves said information by connecting to a plurality of global distribution systems (GDS), travel vendor databases, multi-use terminals of a plurality of travel counselors, and travel websites such that the plurality of travel counselors have access to the travel vendor databases and the plurality of GDSs, wherein the connection is accomplished via a frame relay network having hubsites and using an asynchronous transfer mode (ATM) backbone and multiple redundant data centers;
    wherein the connection further includes a translation server configured to communicate natively with the plurality of GDSs, travel vendor databases, multi-use terminals of a plurality of travel counselors, and travel websites;
    wherein the translation server is configured to communicate with the plurality of GDSs, travel vendor databases, multi-use terminals of a plurality of travel counselors, and travel websites via at least one of: (i) XML, (ii) a native application programming interface (API), or (iii) an open standard alliance;
    switching among GDSs for the trip request, using the connection, in response to a configuration item which identifies a particular GDS based upon minimum transaction requirement;
    said booking engine is configured to receive a request from an agent in communication with said booking engine, retrieve information from said technology provider in accordance with said request, present said retrieved information to said agent, and facilitate a transaction between said agent and said provider of travel-related services; and,
    wherein said retrieved information comprises information content responsive to said request from said agent, and an information format configured for presenting said information content.

2. The system of claim 1, wherein said information content comprises information regarding available inventory from a predefined carrier within a predefined time period.

3. The system of claim 2, wherein said retrieved information comprises information content that has been selected for inclusion.

4. The system of claim 3, wherein said retrieved information comprises information content regarding available inventory from a predefined carrier.

5. The system of claim 4, wherein said retrieved information comprises information content regarding a predefined parameter.

6. The system of claim 5, wherein said information content comprises information in accordance with predefined editing criteria.

7. The system of claim 6, wherein said information format comprises instructions for presenting information in accordance with predefined ranking criteria.

8. The system of claim 7, wherein said information format comprises instructions for presenting information in accordance with discriminatory criteria, wherein said discriminatory criteria comprises instructions for discriminating based on an identity of a carrier.

9. The system of claim 8, wherein said booking engine is configured for receiving, from said agent, an order for reserving a service in a name of a consumer.

10. The system of claim 9, wherein said booking engine is configured for updating a database to reflect a reservation of a service.

11. The system of claim 10, wherein said booking engine is configured for sending at least one of information and indicia to at least one of said consumer and said agent to enable said consumer to utilize a service.

12. The system of claim 11, wherein said booking engine is configured for receiving a payment on behalf of at least one of said consumer and said agent.

13. The system of claim 12, wherein said booking engine is configured for facilitating distribution of fees and commissions among said agent and said provider of travel-related services.

14. The system of claim 13, wherein said booking engine is configured for facilitating payment, from said agent to said carrier, of a fee for a service.

15. The system of claim 14, wherein said booking engine is configured for facilitating payment, from said carrier to said booking engine, of a commission for facilitating said transaction.

16. The system of claim 15, wherein said booking engine is configured for facilitating payment of fees to said technology provider, said agent, and said booking engine to settle said transaction.

17. A method for facilitating a transaction among a consumer and a provider of travel-related services comprising:
    receiving a request from an agent;
    retrieving information from a technology provider, wherein said technology provider receives information regarding available travel-related services and, wherein said technology partner is independent from said booking engine and said provider of travel-related services and, wherein said information is received by said technology provider by connecting to a plurality of global distribution systems (GDS), travel vendor databases, multi-use terminals of a plurality of travel counselors, and travel websites such that the plurality of travel counselors have access to the travel vendor databases and the plurality of GDSs, wherein the connection is accomplished via a frame relay network having hubsites and using an asynchronous transfer mode (ATM) backbone and multiple redundant data centers;
    wherein the connection further includes a translation server configured to communicate natively with the plurality of GDSs, travel vendor databases, multi-use terminals of a plurality of travel counselors, and travel websites;
    wherein the translation server is configured to communicate with the plurality of GDSs, travel vendor databases, multi-use terminals of a plurality of travel counselors, and travel websites via at least one of: (i) XML, (ii) a native application programming interface (API), or (iii) an open standard alliance;

switching among GDSs for the trip request, using the connection, in response to a configuration item which identifies a particular GDS based upon minimum transaction requirement;

defining an information content and an information format;

presenting said retrieved information to an agent and excluding information that has been selected for exclusion;

receiving, from said agent, an order configured for reserving a service for said consumer;

updating a database to reflect said reservation of said service;

reducing an inventory, maintained on a database, of available services;

sending, to said agent, information to enable said consumer to utilize said service;

receiving a payment on behalf of said agent; and distributing fees and commissions among said agent and said provider of travel-related services.

18. The method of claim 17, wherein said step of distributing fees and commissions comprises:

facilitating payment, from said agent to a carrier, of said fees for said service;

facilitating payment, from said carrier to said booking engine, of said commissions for facilitating the transaction; and facilitating payment of said fees to settle said transaction to said technology provider, said agent, and said booking engine.

* * * * *

UNITED STATES PATENT AND TRADEMARK OFFICE
Certificate

Patent No. 7,539,620 B2                                                   Patented: May 26, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Meera Iyer, Houston, TX (US); Andrew Winterton, Berkshire (GB); Sarah Wynn, Madison, NJ (US); and Lawrence A. Borstein, New York, NY (US).

Signed and Sealed this Twenty-sixth Day of February 2013.

*JAMISUE PLUCINSKI*
*Supervisory Patent Examiner*
*Art Unit 3629*
*Technology Center 3600*